(12) United States Patent
Chen

(10) Patent No.: US 12,744,483 B2
(45) Date of Patent: Sep. 22, 2026

(54) AC-TO-DC CONVERTER AND VARIABLE-FREQUENCY DRIVE

(71) Applicant: INNER ENERGY TECHNOLOGY CO., LTD., Taoyuan City (TW)

(72) Inventor: Hao-Ming Chen, Taoyuan City (TW)

(73) Assignee: INNER ENERGY TECHNOLOGY CO., LTD., Taoyuan (TW)

( * ) Notice: Subject to any disclaimer, the term of this patent is extended or adjusted under 35 U.S.C. 154(b) by 247 days.

(21) Appl. No.: 18/631,477

(22) Filed: Apr. 10, 2024

(65) Prior Publication Data

US 2024/0356475 A1 Oct. 24, 2024

(30) Foreign Application Priority Data

Apr. 21, 2023 (TW) ................................ 112114983

(51) Int. Cl.
*H02P 27/06* (2006.01)
*H02P 3/18* (2006.01)
(Continued)

(52) U.S. Cl.
CPC ................ *H02P 27/06* (2013.01); *H02P 3/18* (2013.01); *H02P 23/20* (2016.02); *H02P 23/28* (2016.02)

(58) Field of Classification Search
CPC .......... H02P 6/085; H02P 6/157; H02P 6/182; H02P 23/28; H02P 23/20; H02P 27/06; H02P 27/08; H02P 3/12; H02P 2201/03; H02P 2201/01; H02P 27/085; H02P 3/18; H02P 9/305; H02P 9/30; H02P 25/024; H02P 27/04; H02P 29/00; H02P 29/032; H02P 7/29; H02M 5/458; H02M 1/32; H02M 1/322; H02M 1/36; H02M 3/3155; H02M 5/293; H02M 7/483; H02M 1/4233; H02M 5/2932; H02M 1/083; H02M 7/53871; H02M 1/4216; H02M 3/155; H02M 3/315; H02M 3/33507;
(Continued)

(56) References Cited

U.S. PATENT DOCUMENTS 4,523,267 A * 6/1985 Mehl .................. H02M 7/1626
363/136
6,737,762 B2 * 5/2004 Koenig .................. H02J 9/062
307/64

FOREIGN PATENT DOCUMENTS

CN 109510489 A 3/2019
CN 115411948 A 11/2022
(Continued)

*Primary Examiner* — Antony M Paul
(74) *Attorney, Agent, or Firm* — HSML P.C.

(57) ABSTRACT

An AC-to-DC converter adapted to receive an AC input voltage includes an energy storage element, a plurality of SCRs, and a first control unit. The energy storage element is a supercapacitor or a lithium-ion capacitor. The SCRs are electrically connected to each other to form a full-bridge rectifier that is disposed to receive the AC input voltage, and are electrically connected to the energy storage element. The SCRs are configured to receive a control signal, and to be controlled to switch between a conducting state and a non-conducting state based on the control signal so as to convert the AC input voltage into a DC output voltage. The first control unit is configured to generate the control signal based on the AC input voltage and the DC output voltage in a manner that causes the DC output voltage to be at a predetermined voltage magnitude.

19 Claims, 4 Drawing Sheets

(51) Int. Cl.
*H02P 23/20* (2016.01)
*H02P 23/28* (2016.01)

(58) Field of Classification Search
CPC .. H02M 5/271; H02M 5/4505; H02M 5/4585; H02M 7/00; H02M 7/1626; H02M 7/219; H02M 7/5387; H02M 5/45; H02M 5/257; H02J 9/062; H02J 9/068; H02J 1/102; H02J 2207/20; H02J 7/0029; G05B 15/02; H02H 7/12
See application file for complete search history.

(56) References Cited

FOREIGN PATENT DOCUMENTS

| | | | |
|---|---|---|---|
| JP | 2015-139313 | A | 7/2015 |
| JP | 6229777 | B1 | 11/2017 |
| JP | 2019-165571 | A | 9/2019 |

* cited by examiner

AC-TO-DC CONVERTER AND VARIABLE-FREQUENCY DRIVE

CROSS-REFERENCE TO RELATED APPLICATION

This application claims priority to Taiwanese Invention patent application No. 112114983, filed on Apr. 21, 2023, the entire disclosure of which is incorporated by reference herein.

FIELD

The disclosure relates to an alternating current (AC) to direct current (DC) converter and a variable-frequency drive, and more particularly to an AC-to-DC converter that includes a supercapacitor or a lithium-ion capacitor.

BACKGROUND

A variable-frequency drive (VFD) is capable of smoothly controlling a speed and a torque of an alternating current (AC) motor by changing a frequency or an amplitude of an operating voltage of the AC motor. Referring to FIG. 1, a conventional VFD is adapted to electrically connect with an AC power source 98 and an inductive load 99, and includes a rectifier unit 91, an inverter unit 92, a control unit 93, a filter capacitor 94, and a braking unit 95. The rectifier unit 91 receives an AC voltage V1 from the AC power source 98, and converts the AC voltage V1 into a direct current (DC) input voltage V2. The inverter unit 92 is electrically connected to the rectifier unit 91 and the inductive load 99. The control unit 93 is electrically connected to the inverter unit 92 so as to control the inverter unit 92 to convert the DC input voltage V2 received from the rectifier unit 91 into an AC output voltage V3 that is outputted to the inductive load 99. The control unit 93 further controls a frequency or an amplitude of the AC output voltage V3.

The filter capacitor 94 is an electrolytic capacitor, and is electrically connected between the rectifier unit 91 and the inverter unit 92 so as to filter and stabilize the DC input voltage V2. The braking unit 95 includes a switch 952 and a bleeder resistor 951. The switch 952 and the bleeder resistor 951 are connected in series between one end of the filter capacitor 94 and a grounding point. The bleeder resistor 951 is a power resistor. The switch 952 is controlled by other detector circuits or components such that, when the inductive load 99 does not generate a counter electromotive force (EMF), the switch 952 would be in a non-conducting state, and when the inductive load 99 generates the counter EMF, the switch 952 would be controlled to switch to a conducting state. As such, the energy from the counter EMF generated by the inductive load 99 may be released through the switch 952 and the bleeder resistor 951, thus preventing any one of the rectifier unit 91, the inverter unit 92, and the filter capacitor 94 from being damaged by the counter EMF. As long as the filter capacitor 94 is an electrolytic capacitor, the conventional VFD must include the braking unit 95 to prevent the counter EMF generated by the inductive load 99 from damaging other components of the conventional VFD.

SUMMARY

Therefore, an object of the disclosure is to provide an AC-to-DC converter that includes a supercapacitor or a lithium-ion capacitor that can remove the braking unit from the VFD as in the prior art.

According to the disclosure, an AC-to-DC converter adapted to receive an AC input voltage includes an energy storage element, a plurality of silicon controlled rectifiers (SCRs), and a first control unit. The energy storage element is one of a supercapacitor and a lithium-ion capacitor. The SCRs are electrically connected to each other to form a full-bridge rectifier that is disposed to receive the AC input voltage, and are electrically connected to the energy storage element. The SCRs are configured to receive a control signal, and to be controlled to switch between a conducting state and a non-conducting state based on the control signal so as to convert the AC input voltage into a DC output voltage that is outputted to the energy storage element. The first control unit is configured to detect zero-crossing points of the AC input voltage and a magnitude of the DC output voltage, and to generate the control signal based on the zero-crossing points and the magnitude of the DC output voltage in a manner that causes the DC output voltage to be at a predetermined voltage magnitude.

According to the disclosure, a variable-frequency drive (VFD) adapted to an AC power source and an inductive load is provided. The VFD includes an energy storage element, a plurality of silicon controlled rectifiers (SCRs), a first control unit, an inverter unit, and a second control unit. The energy storage element is one of a supercapacitor and a lithium-ion capacitor. The SCRs are electrically connected to each other to form a full-bridge rectifier that is disposed to receive an AC input voltage from the AC power source, and are electrically connected to the energy storage element. The SCRs are configured to receive a control signal, and to be controlled to switch between a conducting state and a non-conducting state based on the control signal so as to convert the AC input voltage into a DC output voltage that is outputted to the energy storage element. The first control unit is configured to detect zero-crossing points of the AC input voltage and a magnitude of the DC output voltage, to generate the control signal based on the zero-crossing points and the magnitude of the DC output voltage in a manner that causes the DC output voltage to be at a predetermined voltage magnitude, and to adjust the predetermined voltage magnitude based on a power level of the energy storage element. The inverter unit is electrically connected to the SCRs so as to receive the DC output voltage, configured to be controlled to convert the DC output voltage to an AC output voltage, and to be electrically connected to the inductive load so as to output the AC output voltage to the inductive load. The second control unit is electrically connected to the inverter unit, and is configured to control the inverter unit to generate the AC output voltage, and to control one of a frequency and an amplitude of the AC output voltage.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
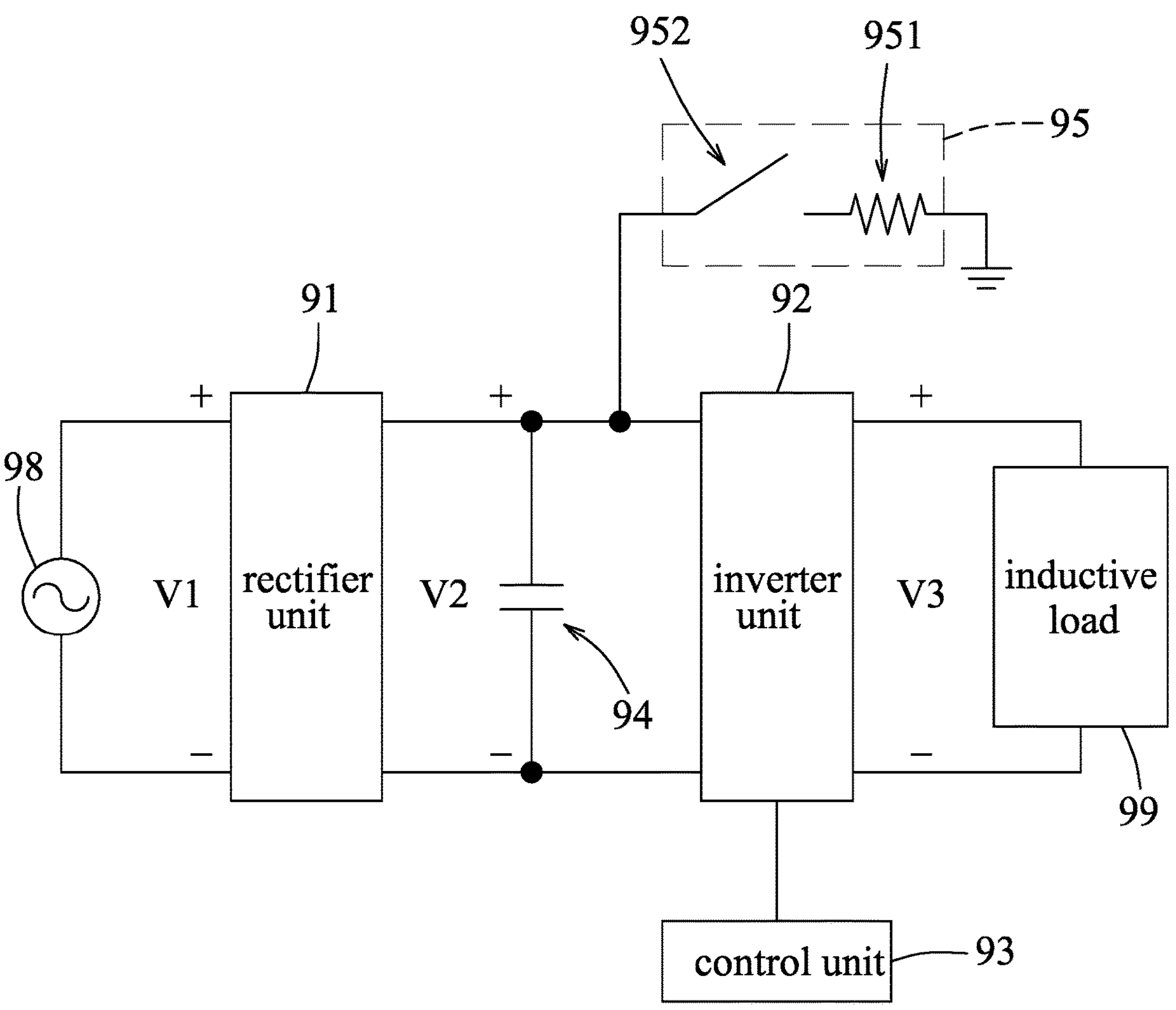
FIG. 1 is a block diagram illustrating a conventional variable-frequency drive (VFD).

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
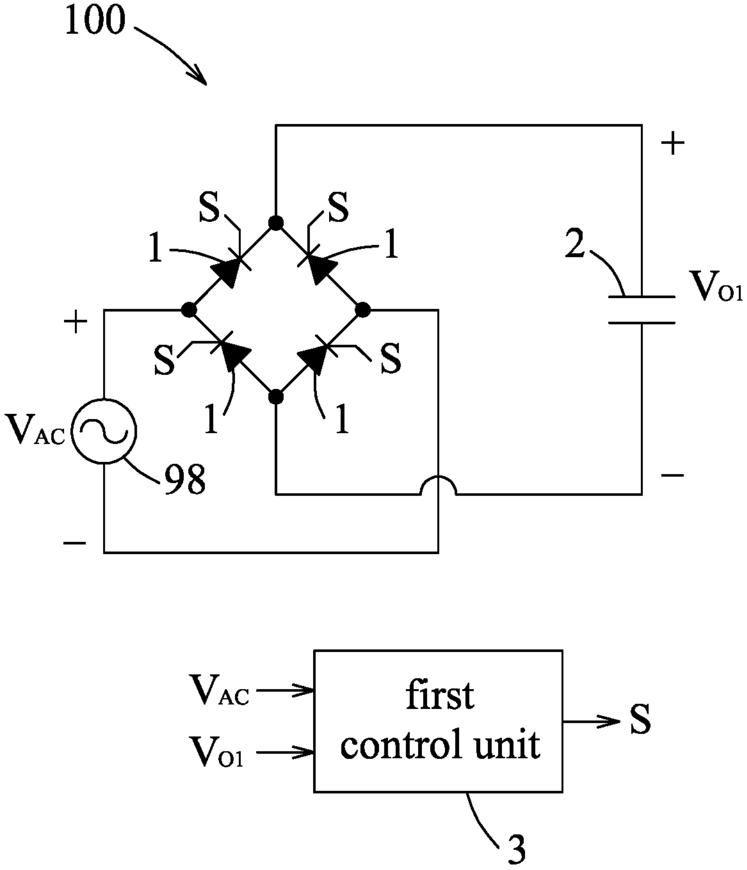
FIG. 2 is a block diagram illustrating an AC-to-DC converter according to an embodiment of the disclosure.

Referring to FIG. 2, an alternating current (AC) to direct current (DC) converter 100 according to an embodiment of the disclosure is provided. The AC-to-DC converter 100 is adapted to receive an AC input voltage $V_{AC}$ from an AC power source 98, and includes a supercapacitor 2, a plurality of silicon controlled rectifiers (SCRs) 1, and a first control unit 3. The AC power source 98 may be mains electricity that provides the AC input voltage $V_{AC}$ with, for example, 220V (effective value) and 60 Hz.

The SCRs 1 are electrically connected to each other to form a full-bridge rectifier that is disposed to receive the AC input voltage $V_{AC}$. In this embodiment, there are four SCRs 1 forming the full-bridge rectifier. The SCRs 1 are further electrically connected to the supercapacitor 2, and are configured to receive a control signal S from the first control unit 3, and to be controlled based on the control signal S to switch between a conducting state and a non-conducting state. When a logic value of the control signal S is equal to a first logical value, the SCRs 1 are switched to the non-conducting state, and when the logic value of the control signal S is equal to a second logical value, the SCRs 1 are switched to the conducting state. In one example, the first logical value is equal to zero, which corresponds to zero volts, and the second logical value is equal to one, which corresponds to a voltage that is based on a specification of the SCRs 1. When the SCRs 1 are in the conducting state, the full-bridge rectifier converts the AC input voltage $V_{AC}$ into a DC output voltage $V_{O1}$, and outputs the DC output voltage $V_{O1}$ to the supercapacitor 2.

The supercapacitor 2 filters and stabilizes the DC output voltage $V_{O1}$ that is received from the SCRs 1. In this embodiment, the supercapacitor 2 is an electric (or electrostatic) double layer capacitor (EDLC), which is an electrochemical capacitor with high energy density. A capacitance of the supercapacitor 2 is much higher, often hundreds to thousands of times higher, than that of a traditional electrolytic capacitor. In one example, the filter capacitor 94 (see FIG. 1) of the prior art has a capacitance of approximately a few hundred μF, while the supercapacitor 2 of the disclosure has a capacitance of 2.65 F, but the disclosure is not limited to such. In some embodiments, the supercapacitor 2 may be replaced with a lithium-ion capacitor. Because the supercapacitor 2 has such a high capacitance, a full-wave rectified signal (i.e., the DC output voltage $V_{O1}$) that passes through the full-bridge rectifier may be stabilized into a stable DC signal.

The first control unit 3 may be a microcontroller unit (MCU) or a combination of the MCU and other peripheral circuits, is electrically connected to the AC power source 98 for detecting zero-crossing points of the AC input voltage $V_{AC}$, and is electrically connected to the SCRs 1 for detecting a magnitude of the DC output voltage $V_{O1}$. The first control unit 3 is further configured to generate the control signal S based on the zero-crossing points of the AC input voltage $V_{AC}$ and the magnitude of the DC output voltage $V_{O1}$ in a manner that causes the DC output voltage $V_{O1}$ to be at a predetermined voltage magnitude.

In one example, a half-bridge rectifier is used to obtain a positive half cycle signal of the AC input voltage $V_{AC}$, and an optical coupler is used to convert the positive half cycle signal of a high peak value (e.g., 311V) to an AC voltage signal that has the same phase as the positive half cycle signal but with a smaller amplitude (e.g., 3.3V). A comparator (e.g., an operational amplifier) is then used to compare the AC voltage signal with a reference voltage (e.g., 0.2V) so as to obtain the zero-crossing points of the AC input voltage $V_{AC}$. In addition to the abovementioned example, a variety of conventional methods or circuits may be used to detect the zero-crossing points of the AC input voltage $V_{AC}$ in other embodiments, and details thereof will not be described in further detail for the sake of brevity.

The first control unit 3 is configured to make each change of the logic value of the control signal S occur at one of the zero-crossing points of the AC input voltage $V_{AC}$, and to make the logic value of the control signal S persist as either the first logical value or the second logical value throughout any period of the AC input voltage $V_{AC}$. When the first control unit 3 determines that the magnitude of the DC output voltage $V_{O1}$ is greater than the predetermined voltage magnitude, the first control unit 3 reduces a number of voltage-raising periods of the AC input voltage, where the voltage-raising periods refer to those periods of the AC input voltage $V_{AC}$ during which the logic value of the control signal S persists as the second logical value within a predetermined length of time (i.e., the first control unit 3 reduces a frequency of occurrence of the voltage-raising periods of the AC input voltage $V_{AC}$). When the first control unit 3 determines that the magnitude of the DC output voltage $V_{O1}$ is smaller than the predetermined voltage magnitude, the first control unit 3 increases the number of the voltage-raising periods of the AC input voltage $V_{AC}$ (i.e., the first control unit 3 increases the frequency of occurrence of the voltage-raising periods of the AC input voltage $V_{AC}$). The predetermined length of time is an integer multiple of a period of the AC input voltage $V_{AC}$. That is to say, the first control unit 3 controls a total length of time when the SCRs 1 are in the conducting state within the predetermined length of time, thus adjusting the DC output voltage $V_{O1}$ correspondingly.

Figure 3:
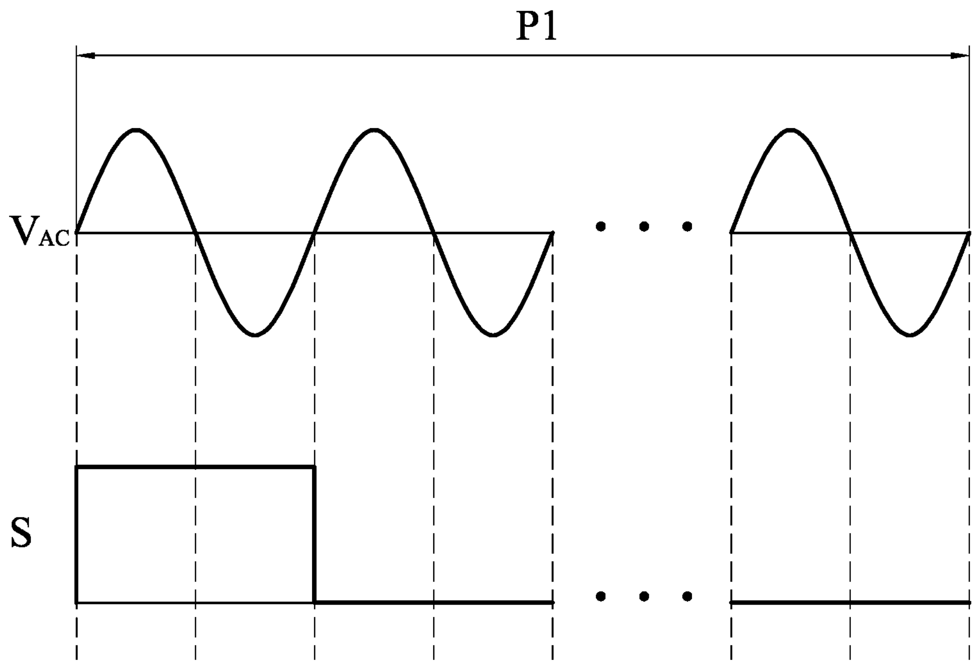
FIG. 3 is a timing diagram illustrating a control signal of a first control unit according to an embodiment of the disclosure.

Further referring to FIG. 3, in one example, the predetermined voltage magnitude is equal to 310V, the predetermined length of time P1 is equal to one second, and the AC input voltage $V_{AC}$ includes 60 cycles of a sine wave signal within the predetermined length of time P1, where the logic value of the control signal S is equal to the second logical value for one cycle (i.e., one period) of the AC input voltage $V_{AC}$, and is equal to the first logical value for the other 59 cycles (i.e., 59 periods) of the AC input voltage $V_{AC}$. It should be noted that FIG. 3 is only illustrating the correspondence in phase between the AC input voltage $V_{AC}$ and the logic value of the control signal S, and should not be considered as a stable condition of the control signal S when the DC output voltage $V_{O1}$ has reached the predetermined voltage magnitude.

Figure 4:
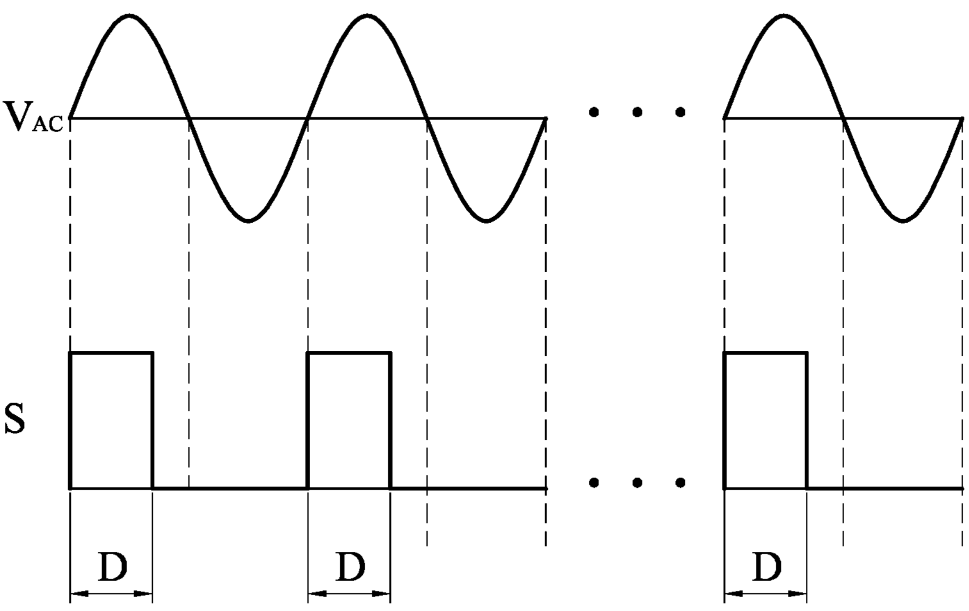
FIG. 4 is a timing diagram illustrating a control signal of a first control unit according to another embodiment of the disclosure.

In some embodiments, the first control unit 3 is configured such that the control signal S is a periodic signal that has a period corresponding to the period of the AC input voltage $V_{AC}$, and that each change of the logic value of the control signal S from the first logical value to the second logical value occur at one of the zero-crossing points of the AC input voltage $V_{AC}$. Referring to FIGS. 2 and 4, the period of the control signal S is equal to the period of the AC input voltage $V_{AC}$. When the first control unit 3 determines that the magnitude of the DC output voltage $V_{O1}$ is greater than the predetermined voltage magnitude, the first control unit 3 decreases a duty cycle D of the control signal S, which is a ratio of a duration where the logic value of the control signal S is equal to the second logical value to the period of the control signal S. When the first control unit 3 determines that the magnitude of the DC output voltage $V_{O1}$ is smaller than the predetermined voltage magnitude, the first control unit 3 increases the duty cycle D of the control signal S. That is to say, the first control unit 3 controls a duration of which the SCRs 1 are in the conducting state for each cycle of the control signal S (e.g., 1/60 seconds), thus adjusting the DC output voltage $V_{O1}$ correspondingly.

Figure 5:
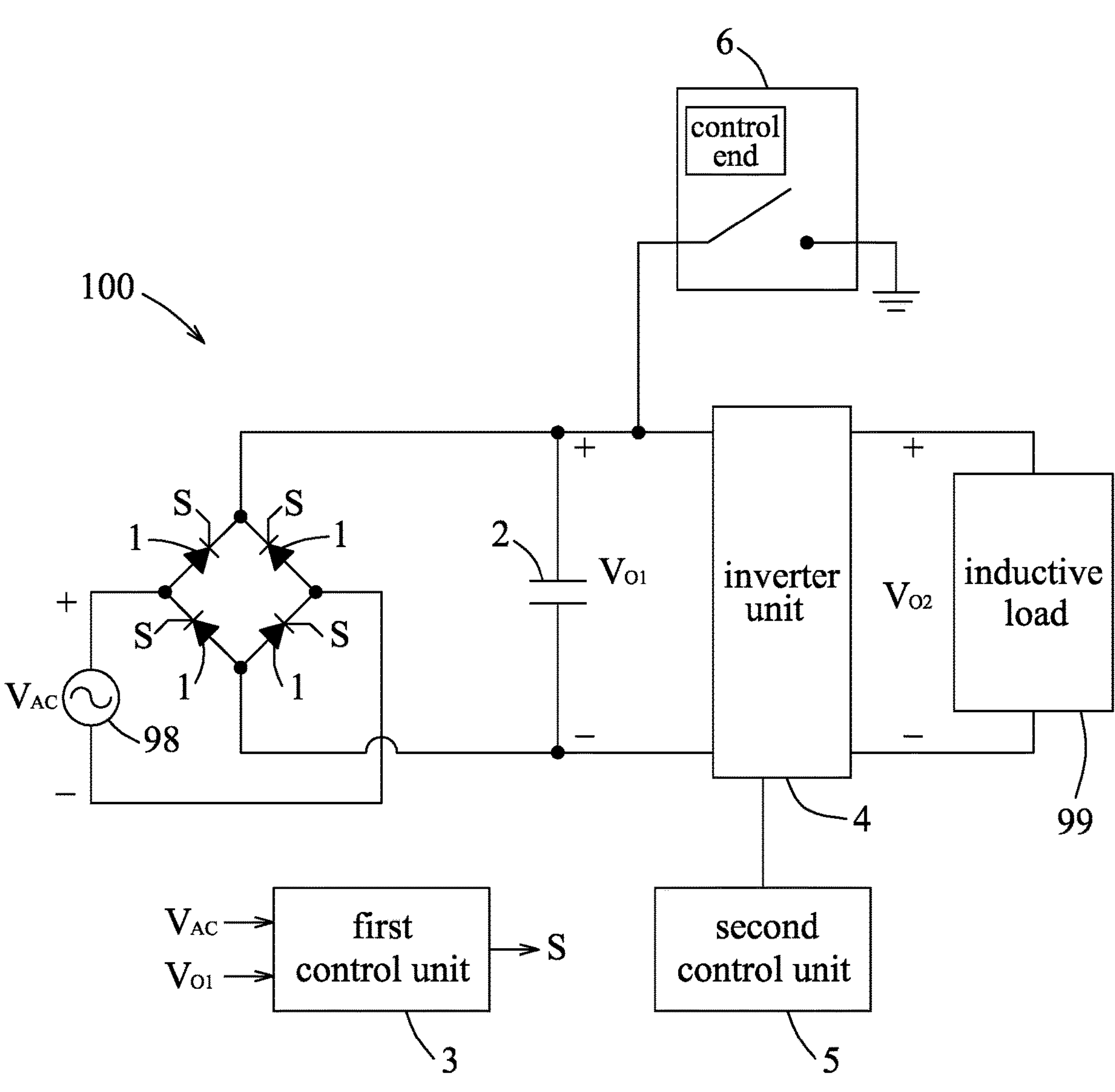
FIG. 5 is a block diagram illustrating a VFD according to an embodiment of the disclosure.

Referring to FIG. 5, a VFD according to an embodiment of the disclosure is adapted to the AC power source 98 and an inductive load 99. In this embodiment, the inductive load 99 is a motor. The VFD includes the AC-to-DC converter 100 mentioned previously, an inverter unit 4, and a second control unit 5, and is used for converting the AC input voltage $V_{AC}$ received from the AC power source 98 into the DC output voltage $V_{O1}$, and further converts the DC output voltage $V_{O1}$ into an AC output voltage $V_{O2}$, so as to smoothly control a speed and a torque of the motor.

In this embodiment, the inverter unit 4 is an inverter, which is a type of DC-to-AC converter, and is electrically connected to the AC-to-DC converter 100 so as to receive the DC output voltage $V_{O1}$. The inverter unit 4 is configured to be controlled by the second control unit 5 to convert the DC output voltage $V_{O1}$ to the AC output voltage $V_{O2}$, and to modulate a phase (or frequency) and/or to adjust an amplitude (i.e., a peak voltage) of the AC output voltage $V_{O2}$. The inverter unit 4 is further electrically connected to the inductive load 99 so as to output the AC output voltage $V_{O2}$ to the inductive load 99.

The second control unit 5 is electrically connected to the inverter unit 4, and is configured to control the inverter unit 4 to generate the AC output voltage $V_{O2}$, and to control the phase (or frequency) and/or the amplitude of the AC output voltage $V_{O2}$, thus controlling, for example, a rotational speed of the motor using different phases (or frequencies), and/or controlling a torque of the motor using different voltages (i.e., different amplitudes of the AC output voltage $V_{O2}$). The second control unit 5 may be an MCU, or any type of known control circuit that may be used to control the inverter unit 4.

In one example, the motor operates based on the AC output voltage $V_{O2}$ and is used to drive an elevator to ascend or descend. When the elevator is ascending, the second control unit 5 controls the frequency and/or the amplitude of the AC output voltage $V_{O2}$ so as to smoothly control the rotational speed and/or the torque of the motor. When the elevator is descending, the motor (i.e., the inductive load 99) would decelerate or brake and would thus generate a counter electromotive force (EMF), and the supercapacitor 2 would absorb and store an energy from the counter EMF so that the DC output voltage $V_{O1}$ remains stable when the motor decelerates or brakes, thereby preventing the full-bridge rectifier (i.e., the SCRs 1) and the inverter unit 4 from being damaged by the counter EMF.

Furthermore, after the motor generates the counter EMF, and when the second control unit 5 controls the inverter unit 4 to generate the AC output voltage $V_{O2}$ again (such as when the elevator is about to change from descending to ascending), the energy from the counter EMF that was stored in the supercapacitor 2 may be transferred to the inductive load 99 through the inverter unit 4, thus reducing the amount of electric power that is required by the inductive load 99 and that needs to be supplied from the AC power source 98. In one example, when the VFD of the disclosure is applied to an elevator (i.e., the inductive load 99 is the motor of the elevator), the VFD is capable of reducing at least 60% of electric energy consumed compared to the prior art (which uses an electrolytic capacitor instead of the supercapacitor 2).

That is to say, when the motor is decelerating or braking, the energy resulting from the counter EMF may be stored in the supercapacitor 2 for use by the motor later on. In comparison to the prior art, where the energy from the counter EMF is released through a bleeder resistor of a braking unit so as to prevent the VFD of the prior art from being damaged, the supercapacitor 2 of the disclosure is not only able to protect the components of the VFD from being damaged, but may also store and reuse the energy from the counter EMF. Additionally, since the supercapacitor 2 is smaller in size compared to the electrolytic capacitor, the size of the VFD may be reduced, and the design of the VFD may be simplified. It should be noted that FIGS. 1, 2, and 5 only show a single circuit for simplicity. In practice, each of the AC input voltage $V_{AC}$ and the AC output voltage $V_{O2}$ is usually a three-phase electric power, and the VFD or the AC-to-DC converter 100 would include a three-phase circuit that corresponds to the AC input voltage $V_{AC}$ and the AC output voltage $V_{O2}$.

When the motor does not require constant operation (such as when the motor is used to drive an elevator), output power (measured in kW) required by the motor may be provided by the AC power source 98 alone, or may be provided by the supercapacitor 2 and the AC power source 98 cooperatively. In one example, the output power required by the motor is 6 kW, wherein 3 KW is provided by the AC power source 98 in real time, and the other 3 KW is drawn from the energy stored in the supercapacitor 2.

In this embodiment, the VFD starts to receive the AC input voltage $V_{AC}$ when the first control unit 3 receives a start signal. In detail, the first control unit 3 is further configured to execute a slow starting procedure upon receipt of the start signal. During the slow starting procedure, the first control unit 3 gradually increases the magnitude of the DC output voltage $V_{O1}$ from zero volts, so as to prevent the supercapacitor 2 from forming a short circuit. After the slow starting procedure ends, the first control unit 3 causes the DC output voltage $V_{O1}$ to be at the predetermined voltage magnitude.

To describe in further detail, the start signal may be generated by, for example, a user pressing a start button (not shown), and the first control unit 3 may gradually increase the magnitude of the DC output voltage $V_{O1}$ by gradually increasing, according to a predetermined mode, the number of the voltage-raising periods of the AC input voltage $V_{AC}$, over time, or gradually increasing the duty cycle D of the control signal S over time, until a voltage across the supercapacitor 2 has reached a predetermined value. The voltage across the supercapacitor 2 is the DC output voltage $V_{O1}$ that is measured near the supercapacitor 2, and reflects the actual storage voltage of the supercapacitor 2 for line impedance consideration. In one example, the predetermined value is equal to 90% of the predetermined voltage magnitude.

In some embodiments, during the slow starting procedure, the first control unit 3 further controls, based on the voltage across the supercapacitor 2, an increase in the number of the voltage-raising periods of the AC input voltage $V_{AC}$ over time, or an increase in the duty cycle D of the control signal S over time, until the voltage across the supercapacitor 2 has reached the predetermined value. That is to say, in this embodiment, instead of using an open-loop control method which adjusts the control signal S according to the predetermined mode, the first control unit 3 uses a closed-loop control method which adjusts the control signal S based on the voltage across the supercapacitor 2 so as to ensure that the slow starting procedure ends only when the voltage across the supercapacitor 2 has reached the predetermined value correctly. As such, the slow starting procedure would not end with the voltage across the supercapacitor 2 being offset from the predetermined value, as may occur when the first control unit 3 uses the open-loop control method.

In the embodiment as illustrated in FIG. 5, the VFD further includes a switch element 6. The switch element 6 may be a relay including a first end that is electrically connected to the supercapacitor 2, a second end that is grounded, and a control end that is configured to receive a turn-off signal. The switch element 6 makes electric connection between the first end and the second end when the control end receives the turn-off signal so as to discharge the supercapacitor 2 and cause the voltage across the supercapacitor 2 to reach zero. Otherwise, the switch element 6 breaks electric connection between the first end and the second end.

To describe in further detail, the turn-off signal may be generated and transmitted to the first control unit 3 and the switch element 6 by, for example, the user releasing the start button. Based on the turn-off signal, the first control unit 3 controls the SCRs 1 to stop outputting the DC output voltage $V_{O1}$, and the switch element 6 is closed so that the energy stored in the supercapacitor 2 is released, and the supercapacitor 2 is discharged to zero through the grounded second end, thus complying with safety regulations and preventing the user from getting electric shocks when contacting the VFD. It should be noted that the switch element 6 may slowly discharge the supercapacitor 2 without damaging other components of the VFD because of the high capacitance of the supercapacitor 2, while the switch 952 of the braking unit 95 of the prior art (as shown in FIG. 1) requires quickly switching to the conducting state so as to release the counter EMF before the counter EMF damages other components. That is to say, the switch element 6 does not need to quickly discharge the supercapacitor 2, while the switch 952 must quickly discharge the supercapacitor 2, and thus they have different operating principles and solve different problems, and require components of different specifications.

In some embodiments, the first control unit 3 adjusts the predetermined voltage magnitude for the DC output voltage $V_{O1}$ based on a power level of the supercapacitor 2. To describe in further detail, the predetermined voltage magnitude preset and prestored in the first control unit 3 is equal to a first setting value (e.g., 310V), and the first control unit 3 may determine the power level of the supercapacitor 2 based on the voltage across the supercapacitor 2 or using a coulombmeter. When the first control unit 3 determines that the power level of the supercapacitor 2 is smaller than a threshold value, the first control unit 3 increases the predetermined voltage magnitude from the first setting value to a second setting value (e.g., 312V) so as to increase a charging speed of the supercapacitor 2, thus reducing the time required for the DC output voltage $V_{O1}$ to reach the first setting value. In a case where the first control unit 3 determines the power level of the supercapacitor 2 based on the voltage across the supercapacitor 2, the first control unit 3 will determine that the power level of the supercapacitor 2 is smaller than the threshold value when the first control unit 3 determines that the voltage across the supercapacitor 2 is smaller than, for example, 50% of the first setting value (i.e., the threshold value corresponds to 50% of the first setting value), but the disclosure is not limited to such.

It should be further noted that, in some embodiments where multiple inductive loads are used, the VFD may include a plurality of pairs of the inverter unit 4 and the second control unit 5 that correspond respectively to the inductive loads 99. Accordingly, the AC-to-DC converter 100 of the VFD outputs the DC output voltage $V_{O1}$ to the inverter unit 4 of each of the pairs instead of just one inverter unit 4.

In summary, since the energy storage element in the disclosure is the supercapacitor 2 or the lithium-ion capacitor that has a high capacitance, the energy storage element has great stabilizing and filtering effect on the DC output voltage $V_{O1}$ that is generated by the full-bridge rectifier consisting of the SCRs 1. The first control unit 3 may control conversion of the AC input voltage $V_{AC}$ to the DC output voltage $V_{O1}$ by the SCRs 1, and the switch element 6 may prevent short circuit and electric shock risks when starting and shutting down the VFD. Furthermore, the VFD of the disclosure does not require the braking unit 95 as required in the prior art for releasing the counter EMF generated by the inductive load 99, instead, the VFD of the disclosure may effectively absorb and store energy resulting from the counter EMF that is generated by the inductive load 99 in the energy storage element.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An alternating current (AC) to direct current (DC) converter adapted to receive an AC input voltage, comprising:

an energy storage element, which is one of a supercapacitor and a lithium-ion capacitor;

a plurality of silicon controlled rectifiers (SCRs) electrically connected to each other to form a full-bridge rectifier that is disposed to receive the AC input voltage, and electrically connected to said energy storage element, said SCRs being configured to receive a control signal, and to be controlled to switch between a conducting state and a non-conducting state based on the control signal so as to convert the AC input voltage into a DC output voltage that is outputted to said energy storage element; and a first control unit configured to detect zero-crossing points of the AC input voltage and a magnitude of the DC output voltage, and to generate the control signal based on the zero-crossing points and the magnitude of the DC output voltage in a manner that causes the DC output voltage to be at a predetermined voltage magnitude, wherein when a logic value of the control signal is equal to a first logical value, said SCRs are in the non-conducting state, wherein when the logic value of the control signal is equal to a second logical value, said SCRs are in the conducting state, wherein said first control unit is configured to make each change of the logic value of the control signal occur at one of the zero-crossing points of the AC input voltage, and the logic value of the control signal persists as one of the first logical value and the second logical value throughout any period of the AC input voltage, wherein said first control unit is further configured to reduce a number of voltage-raising periods of the AC input voltage when said first control unit determines that the magnitude of the DC output voltage is greater than the predetermined voltage magnitude, where the voltage-raising periods are, within a predetermined length of time, those periods of the AC input voltage during which the logic value of the control signal persists as the second logical value, and wherein said first control unit is further configured to increase the number of the voltage-raising periods of the AC input voltage when said first control unit determines that the DC output voltage is smaller than the predetermined voltage magnitude.

2. A variable-frequency drive (VFD) adapted to an AC power source and an inductive load, comprising:

said AC-to-DC converter as claimed in claim 1, configured to receive the AC input voltage from the AC power source, and to convert the AC input voltage to the DC output voltage;

an inverter unit electrically connected to said AC-to-DC converter so as to receive the DC output voltage, configured to be controlled to convert the DC output voltage to an AC output voltage, and to be electrically connected to the inductive load so as to output the AC output voltage to the inductive load; and a second control unit electrically connected to said inverter unit, and configured to control said inverter unit to generate the AC output voltage, and to control one of a frequency and an amplitude of the AC output voltage.

3. The VFD as claimed in claim 2, the inductive load being a motor that operates based on the AC output voltage, and a counter electromotive force being generated when the motor decelerates or brakes, wherein said energy storage element is configured to absorb and store energy resulting from the counter electromotive force, so that the DC output voltage remains stable when the motor decelerates or brakes, thereby preventing said SCRs and said inverter unit from being damaged by the counter electromotive force.

4. The VFD as claimed in claim 2, wherein said first control unit is configured to, when the VFD starts to receive the AC input voltage upon receiving a start signal, execute a slow starting procedure based on the start signal, where said first control unit gradually increases the number of the voltage-raising periods of the AC input voltage over time, until a voltage across said energy storage element has reached a predetermined value, so as to prevent said energy storage element from forming a short circuit.

5. The VFD as claimed in claim 4, wherein said first control unit is further configured to, during the slow starting procedure based on the voltage across said energy storage element, control an increase in the number of the voltage-raising periods of the AC input voltage over time, until the voltage across said energy storage element has reached the predetermined value.

6. The VFD as claimed in claim 2, further comprising a switch element including a first end that is electrically connected to said energy storage element, a second end that is grounded, and a control end, wherein said switch element is configured to make electric connection between said first end and said second end when said control end receives a turn-off signal so as to discharge said energy storage element; and wherein said switch element is configured to break electric connection between said first end and said second end when otherwise.

7. An alternating current (AC) to direct current (DC) converter adapted to receive an AC input voltage, comprising:

an energy storage element, which is one of a supercapacitor and a lithium-ion capacitor;

a plurality of silicon controlled rectifiers (SCRs) electrically connected to each other to form a full-bridge rectifier that is disposed to receive the AC input voltage, and electrically connected to said energy storage element, said SCRs being configured to receive a control signal, and to be controlled to switch between a conducting state and a non-conducting state based on the control signal so as to convert the AC input voltage into a DC output voltage that is outputted to said energy storage element; and a first control unit configured to detect zero-crossing points of the AC input voltage and a magnitude of the DC output voltage, and to generate the control signal based on the zero-crossing points and the magnitude of the DC output voltage in a manner that causes the DC output voltage to be at a predetermined voltage magnitude, wherein when a logic value of the control signal is equal to a first logical value, said SCRs are in the non-conducting state, wherein when the logic value of the control signal is equal to a second logical value, said SCRs are in the conducting state, wherein said first control unit is configured to make each change of the logic value of the control signal from the first logical value to the second logical value occur at one of the zero-crossing points of the AC input voltage, and the control signal is a periodic signal having a period that corresponds to a period of the AC input voltage, wherein said first control unit is further configured to reduce a duty cycle of the control signal when said first control unit determines that the magnitude of the DC output voltage is greater than the predetermined voltage magnitude, where the duty cycle of the control signal is a ratio of a duration where the logic value of the control signal is equal to the second logical value to the period of the control signal, and wherein said first control unit is further configured to increase the duty cycle of the control signal when said first control unit determines that the magnitude of the DC output voltage is smaller than the predetermined voltage magnitude.

8. A variable-frequency drive (VFD) adapted to an AC power source and an inductive load, comprising:

said AC-to-DC converter as claimed in claim 7, configured to receive the AC input voltage from the AC power source, and to convert the AC input voltage to the DC output voltage;

an inverter unit electrically connected to said AC-to-DC converter so as to receive the DC output voltage, configured to be controlled to convert the DC output voltage to an AC output voltage, and to be electrically connected to the inductive load so as to output the AC output voltage to the inductive load; and a second control unit electrically connected to said inverter unit, and configured to control said inverter unit to generate the AC output voltage, and to control one of a frequency and an amplitude of the AC output voltage.

9. The VFD as claimed in claim 8, the inductive load being a motor that operates based on the AC output voltage, and a counter electromotive force being generated when the motor decelerates or brakes, wherein said energy storage element is configured to absorb and store energy resulting from the counter electromotive force, so that the DC output voltage remains stable when the motor decelerates or brakes, thereby preventing said SCRs and said inverter unit from being damaged by the counter electromotive force.

10. The VFD as claimed in claim 8, wherein said first control unit is configured to, when the VFD starts to receive the AC input voltage upon receiving a start signal, execute a slow starting procedure based on the start signal, where said first control unit gradually increases the duty cycle of the control signal over time, until a voltage across said energy storage element has reached a predetermined value, so as to prevent said energy storage element from forming a short circuit.

11. The VFD as claimed in claim 10, wherein said first control unit is further configured to, during the slow starting procedure based on the voltage across said energy storage element, control an increase in the duty cycle of the control signal over time, until the voltage across said energy storage element has reached the predetermined value.

12. The VFD as claimed in claim 8, further comprising a switch element including a first end that is electrically connected to said energy storage element, a second end that is grounded, and a control end, wherein said switch element is configured to make electric connection between said first end and said second end when said control end receives a turn-off signal so as to discharge said energy storage element; and wherein said switch element is configured to break electric connection between said first end and said second end when otherwise.

13. A variable-frequency drive (VFD) adapted to an alternating current power source and an inductive load, comprising:

an alternating current (AC) to direct current (DC) converter including an energy storage element, which is one of a supercapacitor and a lithium-ion capacitor, a plurality of silicon controlled rectifiers (SCRs) electrically connected to each other to form a full-bridge rectifier that is disposed to receive an AC input voltage from the AC power source, and electrically connected to said energy storage element, said SCRs being configured to receive a control signal, and to be controlled to switch between a conducting state and a non-conducting state based on the control signal so as to convert the AC input voltage into a DC output voltage that is outputted to said energy storage element, and a first control unit configured to detect zero-crossing points of the AC input voltage and a magnitude of the DC output voltage, and to generate the control signal based on the zero-crossing points and the magnitude of the DC output voltage in a manner that causes the DC output voltage to be at a predetermined voltage magnitude, an inverter unit electrically connected to said AC-to-DC converter so as to receive the DC output voltage, configured to be controlled to convert the DC output voltage to an AC output voltage, and to be electrically connected to the inductive load so as to output the AC output voltage to the inductive load; and a second control unit electrically connected to said inverter unit, and configured to control said inverter unit to generate the AC output voltage, and to control one of a frequency and an amplitude of the AC output voltage.

14. The VFD as claimed in claim 13, the inductive load being a motor that operates based on the AC output voltage, and a counter electromotive force being generated when the motor decelerates or brakes, wherein said energy storage element is configured to absorb and store energy resulting from the counter electromotive force, so that the DC output voltage remains stable when the motor decelerates or brakes, thereby preventing said SCRs and said inverter unit from being damaged by the counter electromotive force.

15. The VFD as claimed in claim 13, wherein:

when a logic value of the control signal is equal to a first logical value, said SCRs are in the non-conducting state; and when the logic value of the control signal is equal to a second logical value, said SCRs are in the conducting state;

wherein said first control unit is configured to, when the VFD starts to receive the AC input voltage upon receiving a start signal, execute a slow starting procedure based on the start signal, where said first control unit gradually increases, over time, one of a number of voltage-raising periods of the AC input voltage and a duty cycle of the control signal, until a voltage across said energy storage element has reached a predetermined value, so as to prevent said energy storage element from forming a short circuit; and wherein the voltage-raising periods are those periods of the AC input voltage during which the logic value of the control signal persists as the second logical value within a predetermined length of time, and the duty cycle of the control signal is a ratio of a duration where the logic value of the control signal is equal to the second logical value to a period of the control signal.

16. The VFD as claimed in claim 15, wherein said first control unit is further configured to, during the slow starting procedure based on the voltage across said energy storage element, control an increase in one of the number of the voltage-raising periods of the AC input voltage and the duty cycle of the control signal over time, until the voltage across said energy storage element has reached the predetermined value.

17. The VFD as claimed in claim 13, further comprising a switch element including a first end that is electrically connected to said energy storage element, a second end that is grounded, and a control end, wherein said switch element is configured to make electric connection between said first end and said second end when said control end receives a turn-off signal so as to discharge said energy storage element; and wherein said switch element is configured to break electric connection between said first end and said second end when otherwise.

18. The VFD as claimed in claim 13, wherein:

said first control unit is configured to adjust the predetermined voltage magnitude based on a power level of said energy storage element.

19. The VFD as claimed in claim 18, wherein said first control unit is configured to, when the power level of said energy storage element is smaller than a threshold value, adjust the predetermined voltage magnitude to change from a first setting value to a second setting value that is greater than the first setting value so as to increase a charging speed of said energy storage element, thus reducing time required for the DC output voltage to reach the first setting value.

* * * * *